Oct. 11, 1949.   J. D. ROVICK   2,484,314
ROTARY STOCK REMOVING METHOD AND APPARATUS
Filed Aug. 9, 1944   2 Sheets-Sheet 1
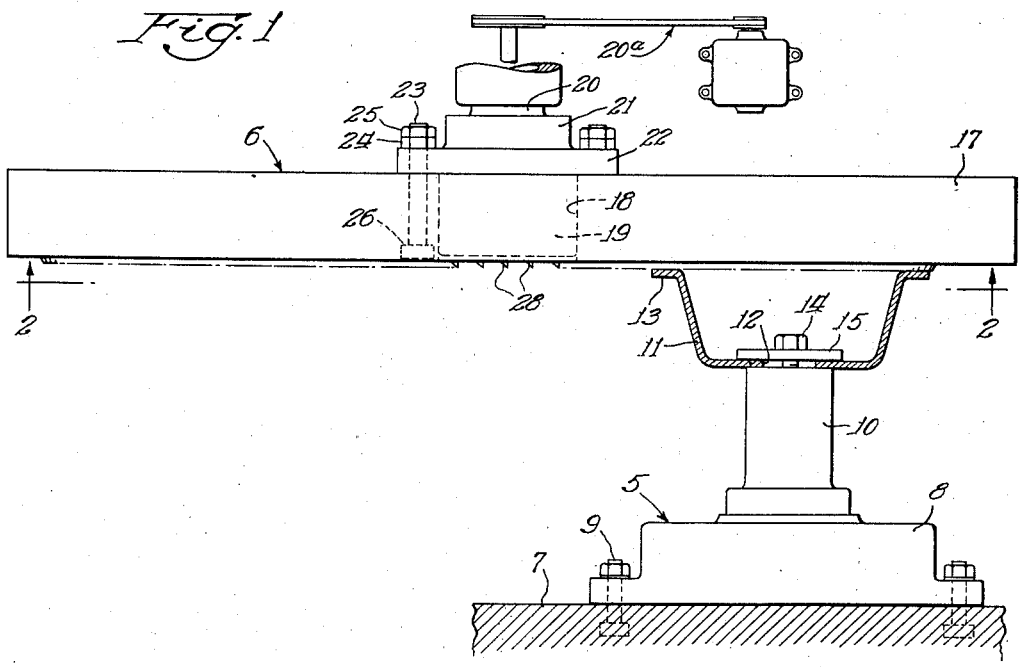
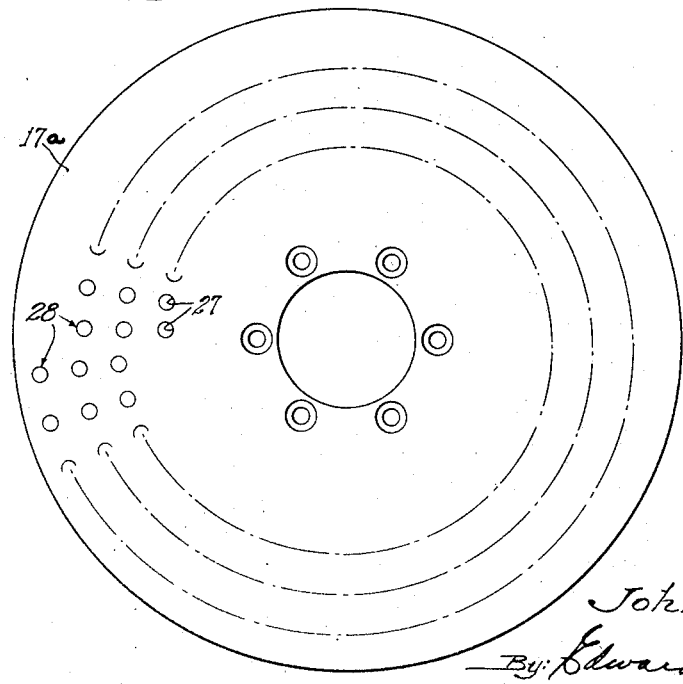
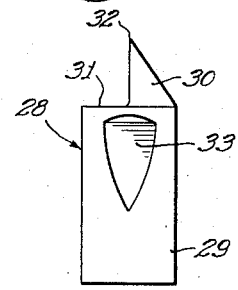
Inventor:
John D. Rovick
By: Edward C. Fitzhugh
Atty.

Oct. 11, 1949.  J. D. ROVICK  2,484,314
ROTARY STOCK REMOVING METHOD AND APPARATUS
Filed Aug. 9, 1944  2 Sheets-Sheet 2
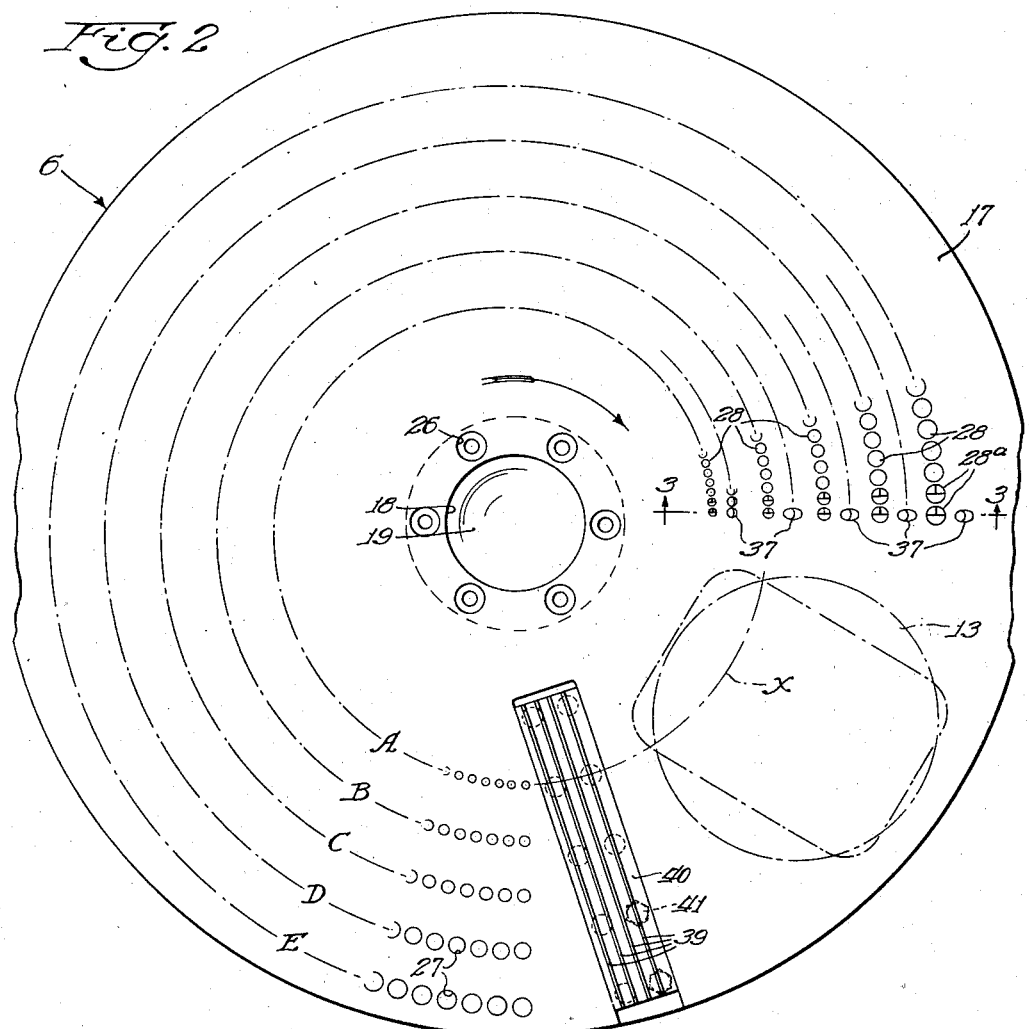
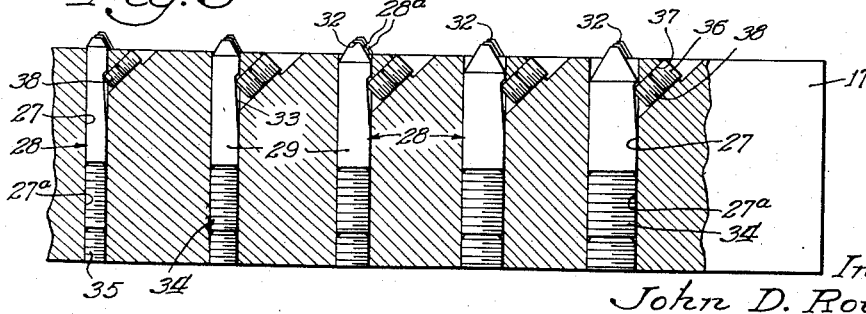
Inventor:
John D. Rovick Patented Oct. 11, 1949

2,484,314

UNITED STATES PATENT OFFICE 2,484,314

ROTARY STOCK REMOVING METHOD AND APPARATUS

John D. Rovick, Muncie, Ind., assignor to Borg-Warner Corporation, Chicago, Ill., a corporation of Illinois Application August 9, 1944, Serial No. 548,779

2 Claims. (Cl. 90—18)

The present invention relates to an apparatus for removing stock from a blank, and also relates to a method for effecting such removal.

More particularly the improvements herein disclosed relate to removing and smoothing the surfaces of castings and forgings, for example the face of the attaching flange of the closure plate and the opposing face of a clutch housing to provide true surfaces thereon whereby a tight fit is effected with relation to the confronting members aforesaid.

One of the principal objects of the present invention is to simplify the construction and operation of a stock removing apparatus such as contemplated herein, and to improve the efficiency, operation, and dependability of such apparatus.

Another principal object of this invention is to provide an apparatus wherein the removal of stock from a blank is accomplished in a relatively rapid manner and with a high degree of efficiency, thus effecting the saving of a considerable amount of time in the finishing of the blank. In this connection it will be stated that the removal operation is capable of being completed with the present apparatus during a single rotation of the cutter head. In other words, the operation of removing the stock from the blank is performed by gangs of cutting tools that are arranged for successive cutting operations upon the blank and effect the removal from the full width of the blank, or area to be removed, without necessitating a repetition of a cycle of operation.

Another principal object of this invention is to provide a simplified, rapid, and efficient method of removing stock from a blank by means of cutters, which comprises progressively cutting away the stock in a plurality of overlapping paths across the blank while effecting relatively rotative movement between the cutters and the blank to define spiral cutting paths. In this connection the present method contemplates completing the removal of material during one rotational movement between the cutters and the blank.

In the present apparatus the arrangement of the cutting tools is such that each tool removes a small amount of stock, due to the fact that the cuts are made in an overlapping manner, and since there is a multiplicity of these tools the rotational movement is reduced to a minimum speed, thus generating less heat and requiring infrequent tool grinding, with the result that many pieces of stock may be thus prepared without taking down the head for regrinding the cutting edges of the tools. The set-up in the present apparatus is quite rigid, and since a small width of stock is removed by each tool there is an absence of chatter which results in a smoother surface on the blank.

It is also an object of the present invention to provide a novel arrangement of the cutting tools in an apparatus for the removal of stock from a blank to thereby effectively perform the method that is contemplated herein. The arrangement disclosed herein provides several "starting" cutters that cut successively deeper into the stock at the beginning of the operation until the desired depth of cut has been reached, and thereafter the remaining cutters will remove the stock at this latter depth.

Additional objects, aims, and advantages of the improvement disclosed herein will be apparent to persons who are skilled in the art after the construction and operation of the stock removing apparatus and the method of practicing the same is understood from the within description.

It is preferred to accomplish the numerous objects of this invention and to practice the same in substantially the manner hereinafter fully described and as more particularly pointed out in the appended claims, reference being made to the accompanying drawings that form a part of this specification, wherein:

Fig. 1 is a vertical side elevation of an apparatus for removing stock from a blank such as contemplated herein;

Fig. 2 is a view on line 2—2 of Fig. 1 of the cutter head or tool holder, showing the novel arrangement of the cutter tools thereon;

Fig. 3 is a sectional view on the plane of line 3—3 of Fig. 2, disclosing details of the manner of securing the tools in the head or holder;

Fig. 4 is a view similar to Fig. 2, showing a modification of the cutter head assembly; and Fig. 5 is a detail view of a cutting tool.

The drawings are to be understood as being more or less of a schematic character for the purpose of disclosing typical or preferred forms of the improvements in the apparatus and method contemplated herein, and in these drawings like reference characters identify the same parts wherever they appear in the different views.

The structure which is shown in Fig. 1 comprises a work holder 5 and a cutter head 6 that are disposed in confronting relation to each other.

The work holder is shown in the form of a mounting jig that is supported upon a bed 7 of a drill press, milling machine or other structure, and it embodies a spider or base 8 that is attached by suitable clamping members 9 to the bed, and extending away from said base there is a pilot or post 10. The work piece or stock upon which the cutting operation is performed is, in the present instance, a bell housing for a clutch, the housing comprising a metal casting consisting of a bulged hollow body 11 having an approximately centrally located shaft opening 12 and an annular marginal flange 13 that is adapted to be fitted to the correspondingly shaped face or flange of the engine. This casting is placed upon the post 10 with the shaft opening 12 at the end thereof and it is clamped in position by means of a bolt 14 screwed into the end of the post and tightened against a presser disk 15 that is large enough in diameter to substantially overlie the shaft opening 12 in the manner shown. When the work is thus mounted the portion thereof (in this instance the face of flange 13 on the bell housing) will be in position to be operated upon to remove a portion of the stock and smooth the same by the cutter assembly on the opposing cutter head 6.

The cutter head 6 comprises a relatively thick metal plate 17 that is preferably of circular outline as shown in Figs. 2 and 4, and it is positioned in confronting relation to the work holder 5 and the portion 13 of the work upon which the cutting operation is performed. The space that separates the plate 17 from the face 13 to be operated on is fixed in a predetermined manner so that the relation of these opposing members will not vary but will remain the same during the cutting away of the stock, and the respective surfaces of these members are preferably constantly in planes that are parallel to each other. Also the spindle that carries the cutter head is disposed with its axis at a right angle to the surface that is engaged by the tools. The axis of this spindle is also at a right angle to the planes of the cutting tips of the tools.

The circular cutter head plate 17 is provided with a central opening 18 to receive the mounting boss 19 that projects axially from the adjacent end of the spindle 20. A hub 21 is formed on the spindle 20 near the mounting boss 19, and between the hub and boss there is an annular flange 22. In assembling the cutter head plate 17 upon the spindle, the boss 19 is inserted into the central opening 18 of said plate until the flange 22 engages the adjacent face of said plate, and the parts are then drawn together by bolts 23 the shanks of which pass through the plate and flange and have nuts 24 screwed upon their extended ends that are maintained against dislodgment by lock nuts 25. In order to provide a plane surface upon the side of the plate that carries the cutters, the heads of bolts 23 are positioned in seats 26 formed in the bolt-receiving holes by enlarging the diameters of the adjacent portions of said holes.

Means 20a are provided for effecting a relative rotation between the confronting work holder and cutter head whereby one of these members is held stationary or inert while the other rotates upon its own axis. This is readily accomplished by anchoring the work holder securely to the stationary table of a drill press and by mounting the cutter head on the rotatable drill press spindle that is actuated in any suitable manner by a prime mover so that the cutter head is revolved therewith. It will be understood that this assembly is optional since the cutter head may be mounted on the spindle of a milling machine and the work carried by a suitable fixture on the table of such machine.

In fact the arrangement is not confined to any particular type of machine, but it is adapted to be installed on any convenient type of machine whereon the work holder is carried by one member of the machine and the cutter head on another member of the machine and either member held stationary while the other member rotates relative thereto.

The cutter head plate 17 is provided with a multiplicity of tool sockets or seats 27 that extend transversely through it and are provided with threads 27a in the portions of their lengths as shown in Fig. 3. These tool sockets 27 are arranged on the plate 17 in a plurality of rows in the manner illustrated in Fig. 2, or they may be arranged in one or more spiral convolutions as in Fig. 4. One of the tools 28 is illustrated in detail in Fig. 5, and comprises a cylindrical body 29 that terminates at its outer or work end in a tapered tip 30 of a mutilated conic or half cone shape formed by removing approximately one-half of the cone to provide an offset or shoulder 31 in front of the cutting edge 32 of the tool. Back of the base of the semi-conic tip 30 the cylindrical body 29 is provided with a flattened area 33 the surface of which is in a plane that is oblique to the axis of the tool body 29 and is disposed at an acute angle thereto.

In mounting the tool 28 in a socket 27 it is inserted therein through the work face of the plate 17 with its tip projecting beyond said face the proper distance to effect the desired depth of cut in the work piece 13. This is predetermined by means of a threaded stop 34 screwed into the opposite portion of the socket 27 and secured in place by a lock screw 35 so that the inner end of the tool 28 abuts the adjacent end of the stop screw 34 as shown in Fig. 3. Outward movement and rotation of the tool is prevented by the instrumentality of a threaded clamping plug 36 that is screwed into a lateral or branch bore 37 the axis of which is aligned with the flattened portion 33 on the shank 29 of the tool so that the inner end of said clamping plug 36 will be engaged therewith and tightened. A lock plug 38 screwed into the branch bore 37 holds the clamp plug in place. The arrangement described properly positions the tool to perform the cutting operation to the predetermined depth in the work; it prevents rotation or dislodgment of the tool; and the tool may be readily removed for sharpening whenever desired.

The disposition of the tools with respect to each other and to the work is an important feature of this invention because of the fact that a predetermined amount of material is removed from the entire width of the surface 13 during a single relative rotation between the cutter head and the work holder. In the present instance it is assumed that the work holder is fixed or stationary and the cutter head 17 is rotated clockwise as indicated by the arrows on Figs. 2 and 4. It is immaterial whether the axes of the holder and head are horizontal or vertical. The tools in Fig. 2 are arranged in a plurality of rows identified as A, B, C, D, and E, each row being equidistantly spaced from the adjacent row and having an arcuate shape. The tools in each row are spaced from each other comparatively short distances apart. The curves of these arcuate rows are preferably volute segments of a continuous helix having a plurality of convolutions as indicated by dot-dash line X on the face of the cutter head. This arrangement disposes a tool in one row in a plane that is offset in a radial direction from the respective plane of the adjacent tool in the same row which effects a successive series of cuts that are concentric to each other and overlapped. When the cutter head shown in Fig. 2 is operated, the rows A, B, C. etc. cut stock from the blank in arcuate concentric zones that are spaced radially from each other. These zones gradually increase in width as the cutting progresses until they become merged with each other at the end of the rows of tools.

The radial distance between the leading tool in the inner row A and the trailing tool in the outer row E is preferably equal to the overall width of the material that is removed from the face 13 of the work piece and by reason of the novel arrangement hereinbefore described the work is completed during a single relative rotation between the work holder and the cutter head. This effects a considerable reduction in the period of time that usually is required for completing a particular job. Since the cutting operation is performed at a comparatively slow speed of rotation there is less heating of the tools and there is practically no chatter in the operation of the apparatus which results in a smoother surface after the cuts have been made. The tool shanks 29 in any given row are preferably of the same diameter throughout the row, but the diameters of the tool shanks in the successive rows are of gradually increased diameters toward the rim of the cutter head as shown in Fig. 3 so the tools in the outer row E are considerably thicker than those in row A but the cutting edges are of the same dimensions for the entire set of tools. These increased shank dimensions are made to compensate for the differential in lineal speed per foot between the outer and inner rows of tools that imposes a heavier duty upon the tools the farther they are away from the axis of rotation. In the arrangement contemplated herein two or more of the leading tools 28a are what may be termed "starting" tools that have their tips projected a less distance from the cutter head face than the remaining tips and therefore are adapted to cut successively deeper into the blank until the required depth has been reached. The remaining tools will remove the stock at the predetermined depth.

Since the rows are of segmental shape the leading and trailing tools of the rows are disposed in spaced relation so that there is a gap on the cutter head face of sufficient dimensions to permit the mounting of instrumentalities for finishing or dressing the face of the blank that has been engaged by the cutting tools. A plurality of elongated blades 39 are mounted in a carrier 40 that is secured to the face of the cutter head 17 by bolts 41. These blades are of sufficient length to engage the area on the blank that has been operated on by the tools in removing material therefrom, and said blades are located in preferably parallel planes that intersect or cross the paths that have been inscribed by the rows of tools to remove any slight unevenness or burrs that may have been left by the tools.

In the modification shown in Fig. 4 several convolutions of spirally arranged tools 28 are employed all of them having shanks of the same diameter. The radial distance between the leading and trailing tools in this modification is equal to at least the overall width of the material to be removed from the blank to effect a completion of the work during a single relative rotation between the cutter head 17a and the work. In this arrangement the tools are mounted in sockets 27 similar to those in the other form described in reference to Fig. 3, and the depth of the cuts made by these tools relative to the face of the tool holder is predetermined by stop screws that are held in place by the lock screws.

In practicing this invention according to Fig. 1, after the stock has been mounted upon the work holder and the tools have been secured in their proper positions in the sockets of the cutter head, the following method is employed to cut away the stock from the work blank. Relative rotation is effected between the cutters and the blank by rotating either the cutter head or the work holder. This relative rotation causes the tools to cut away the material in a plurality of overlapping arcuate paths that progress spirally across the blank until the trailing tool has finished its cut which will be at the edge of the surface being cut away. Since the distance in a radial direction between the first cut and the final cut made by the spiral row of tools is equal to the width of the material removed from the stock, the cutting operation has been effected during a single relative rotation between the cutters and the blank. When there is a plurality of rows of tools employed the cutting is performed in several annular or concentric zones that are separated from each other by portions of the uncut stock, and as the cutting progresses these zones will gradually increase in width until they become merged with each other during the final cuts made by the trailing tools of the respective rows. Thereafter, the uncut surface of the stock will be engaged by the finishing tools that dress down this surface by removing any unevenness or burrs that may remain after the tools have completed their operation upon the stock.

In practicing this invention according to Fig. 4, the work piece is mounted concentrically with respect to the cutter holder and the cutter holder is then rotated and advanced toward the work until the required amount of stock has been removed. This may require more than one revolution of the cutter holder. Where the work piece is small, it may be mounted off to one side of the center of rotation of the cutter holder as shown in Fig. 1, and the cutter holder advanced toward the work until the required amount of stock has been removed.

While this invention has been described in detail in its present preferred forms or embodiments, it will be apparent to persons skilled in the art, after undersstanding the improvements, that various changes and modifications may be made therein without departing from the spirit or scope thereof. It is aimed in the appended claims to cover all such changes and modifications.

I claim:

1. Apparatus for removing a layer of stock from a blank which is supported on a work holder, comprising, a rotatable cutter head opposing said holder; and a multiplicity of individual cutters on said head, all of said cutters being arranged in a pattern along a curved line defining a single continuous helix comprised of a plurality of concentric convolutions having an overall diameter greater than the width of the region on the blank from which stock is to be removed, the work edges of all of said cutters being equidistant from the plane of said cutter head face and in a common plane which is parallel with the face of the work piece; there being a relatively small interrupted region extending radially over a sector of said head, said region dividing the pattern of said single helix into a plurality of concentric rows with each row beginning and terminating at the respective sides of said interrupted region, whereby the trailing cutter of each row traverses the line of said single helix across said interrupted region to the leading cutter of the next radially outward convolution, and the cuts made by the respective rows merge into each other at approximately the trailing end regions of all of said rows.

2. A method of removing a layer of stock from a blank, comprising arranging cutters in a pattern on a rotatable cutter head in a manner to complete the removal of a single layer of stock of uniform thickness during less than a full revolution of the cutter head, the cutters being positioned seriatim along a line inscribing a single continuous helix having a plurality of radially spaced concentric convolutions, the arrangement being such that the work edges of the cutters are all equidistant from the plane of the cutter head face and all in a common plane which parallels the face of the blank; leaving a relatively small interrupted region common to all the convolutions and extending radially over a sector of the head and dividing the convolutions into a plurality of concentric rows on the major portion of the head, each row beginning and terminating at the respective sides of said region; and rotating the aforesaid arrangement in a direction to simultaneously produce a plurality of spaced arcuate cuts on the blank with the lines of said cuts progressing radially of the head and merging into an adjacent cut only at the trailing ends of the rows.

JOHN D. ROVICK.

REFERENCES CITED

The following references are of record in the file of this patent:

UNITED STATES PATENTS

| Number | Name | Date |
| --- | --- | --- |
| 1,555,482 | Pfluger | Sept. 29, 1925 |
| 2,113,554 | Johnson | Apr. 5, 1938 |
| 2,125,943 | McMullen et al. | Aug. 9, 1938 |
| 2,142,517 | Kraus | Jan. 3, 1939 |
| 2,328,493 | Reaney | Aug. 31, 1943 |
| 2,362,364 | Dusevoir | Nov. 7, 1944 |

FOREIGN PATENTS

| Number | Country | Date |
| --- | --- | --- |
| 154,912 | Great Britain | Dec. 3, 1920 |
| 115,647 | Australia | July 30, 1942 |